3,141,042
4,4'-BIS(AMINOMETHYL)-STILBENES
Alexander R. Surrey, Albany, N.Y., assignor to Sterling Drug Inc., New York, N.Y., a corporation of Delaware
No Drawing. Filed May 23, 1961, Ser. No. 111,915
7 Claims. (Cl. 260—562)

This invention relates to compositions of matter of the class 4,4'-disubstituted-stilbene derivatives, to intermediates and process for their preparation.

An aspect of the invention are the N,N,N',N'-tetrasubstituted-4,4'-bis(aminomethyl)-stilbenes having the Formula I

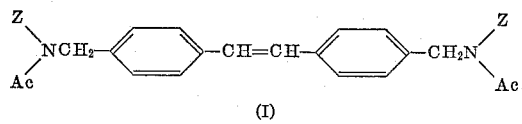

(I)

where Ac is halogenated-(lower-alkanoyl) and Z is a member selected from the group consisting of hydrocarbon radicals of the formula R, hydroxyalkyl radicals of the formula —Y—OH, hydrocarbonoxyalkyl radicals of the formula —Y—O—R and acyloxyalkyl radicals of the formula —Y—O—Ac', where R is a hydrocarbon radical having from one to eight carbon atoms, Y is polycarbon-lower-alkylene having from two to six carbon atoms and having its two free valence bonds on different carbon atoms, and Ac' is carboxylic-acyl having from one to eight carbon atoms.

The compounds represented by Formula I have been tested by standard chemotherapeutic evaluation procedures in vivo in hamsters and found to possess amebacidal activity.

The term "halogenated-(lower alkanoyl)," as used herein and designated above in Formula I as Ac, means alkanoyl radicals having preferably from one to four carbon atoms and from one to three halogen atoms, as illustrated by chloroformyl (chloromethanoyl), chloroacetyl (chloroethanoyl), bromoacetyl, iodoacetyl, fluoroacetyl, dichloroacetyl, dibromoacetyl, diiodoacetyl, difluoroacetyl, bromochloroacetyl, chlorofluoroacetyl, trichloroacetyl, tribromoacetyl, bromodichloroacetyl, chlorodibromacetyl, dichlorofluoroacetyl, chloroiodoacetyl, 2-chloropropanoyl (alpha-chloropropionyl), 3-chloropropanoyl (beta-chloropropionyl), 2-bromopropanoyl, 2,2,-dichloropropanoyl, 2,2-diiodopropanoyl, 2,2-dibromopropanoyl, 2,2-difluoropropanoyl, 2,3-dichloropropanoyl, 2-bromo-3-chloropropanoyl, 2,2,3 - trichloropropanoyl, 2-chlorobutanoyl (alpha-chlorobutyryl), 3-chlorobutanoyl, 4-chlorobutanoyl, 2,2-dichlorobutanoyl, 2,3-dibromobutanoyl, 2,2-dibromobutanoyl, 2,3,4-trichlorobutanoyl, 2,2,3-tribromobutanoyl, and the like.

The hydrocarbon radical designated in Formula I as R has from one to eight carbon atoms, and is, for instance, alkyl, alkenyl, alkynyl, cycloalkyl, cycloalkylalkyl, phenyl, alkyated-phenyl, benzyl or phenethyl, as further illustrated by methyl, ethyl, n-propyl, isopropyl, 2-butyl, isoamyl, n-hexyl, and the like, when alkyl; ethenyl (vinyl), 2-propenyl, 3-butenyl, 2-hexenyl, and the like, when alkenyl; 2-propynyl (propargyl), 3-hexynyl, and the like, when alkynyl; cyclopropyl, cyclobutyl, cyclopental, cyclohexyl, cyclooctyl, and the like, when cycloalkyl; cyclopropylmethyl, cyclopropylethyl, cyclopentylmethyl, cyclohexylmethyl, cyclohexylethyl, and the like, when cycloalkylalkyl; 2-methylphenyl, 4-methylphenyl, 2,4-dimethylphenyl, 3-ethylphenyl, and the like, when alkylated-phenyl.

The polycarbon-lower-alkylene radical designated in Formula I as Y has from two to six carbon atoms and has its two free valence bonds (or connecting linkages) on different carbon atoms, as illustrated by —CH₂CH₂—, —CH(CH₃)CH₂—, —C(CH₃)₂CH₂—
—CH(C₂H₅)CH₂—, —CH₂CH₂CH₂—, —CH₂CH₂CH(CH₃)
—(CH₂)₄—, —(CH₂)₅—, —(CH₂)₆— and the like.

The carboxylic-acyl group designated in Formula I as Ac' has from one to eight carbon atoms, and is, for instance, alkanoyl, haloalkanoyl, dihaloalkanoyl, trihaloalkanoyl, carboxyalkanoyl, di(lower-alkyl)aminoalkanoyl, benzoyl, alkoxybenzoyl, carboxybenzoyl, carbalkoxybenzoyl, halobenzoyl, dihalobenzoyl, trihalobenzoyl, as illustrated by formyl, acetyl (ethanoyl), n-butanoyl, 3-methyl-n-butanoyl, n-hexanoyl, chloroacetyl, bromoacetyl, 3-iodopropanoyl, 2-fluorobutanoyl, dichloroacetyl, 2,2-dibromopropanoyl, 2-chloro - 3 - bromobutanoyl, tribromoacetyl, 2,2,3-trichloropropanoyl, 2,3,4-trichlorobutanoyl, 2,2-dibromo-6-chlorohexanoyl, carboxyethanoyl, 3-carboxypropanoyl, 2-carboxypropanoyl, 6-carboxyhexanoyl, diethylaminoacetyl, 2-dimethylaminopropanoyl, 4-diethylaminobutanoyl, 4-ethoxybenzoyl, 2-methoxybenzoyl, 2-carboxybenzoyl, 4-carbethoxybenzoyl, 4-chlorobenzoyl, 3,4-dibromobenzoyl, 2,4,6-trichlorobenzoyl, and the like.

The N,N,N',N'-tetrasubstituted-4,4'-bis(aminomethyl)-stilbenes having the above Formula I where Z is R, —Y—OH or —Y—O—R as defined above for Formula I are prepared by reacting the corresponding diamine having the Formula II

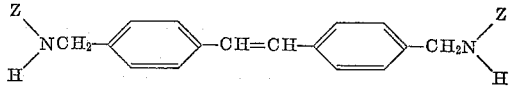

where Z is R, —Y—OH or —Y—OR as given above for Formula I, with two molar equivalents of a halogenated-alkanoylating agent derived from an acid of the formula Ac—OH. Particularly useful halogenated-alkanoylating agents are halogenated-alkanoyl halides having the formula Ac-halogen and lower-alkyl halogenated-alkanoates having the formula Ac—O—(lower-alkyl) where Ac has the meaning given above for Formula I and the lower-alkyl portion of the ester is preferably methyl, but, can have from one to six carbon atoms, as illustrated by methyl, ethyl, isopropyl, n-butyl, 2-pentyl, n-hexyl and the like. The halo radical attached to the carbonyl of the acyl halide is preferably chloro; however, other halo radicals, i.e., bromo, iodo and fluoro, also can be used.

When a lower-alkyl halogenated-alkanoate is used as the halogenated-alkanoylating agent, the reaction is facilitated by warming the reactants together on a steam bath at about 50° to 100° C. The reaction takes place at room temperature; however, the reaction time is usually longer without application of heat. The lower-alkyl halogenated-alkanoates are particularly useful as the halogenated-alkanoylating agents for the preparation of the compounds of Formula I where Z is hydroxyalkyl, e.g., 2-hydroxyethyl, and where Z is methyl.

When a halogenated-alkanoyl halide is used as the halogenated-alkanoylating agent for the preparation of the compounds of Formula I, the reaction is carried out preferably below room temperature, e.g., between about 0° C.–10° C., and preferably in the presence of an acidacceptor, e.g., NaOH, to take up the hydrogen halide formed by the reaction.

Illustrations of the process of this aspect of my invention are: the preparation of N,N'-bis(dichloroacetyl)-N,N' - bis(2-ethoxyethyl)-4,4'-bis(aminomethyl)stilbene by reacting N,N'-bis(2-ethoxyethyl)-4,4'-bis(aminomethyl)stilbene with dichloroacetyl chloride; the preparation of N,N'-bis(bromoacetyl)-N,N'-bis(2-methoxyethyl)-4,4'-bis(aminomethyl)stilbene by reacting N,N'-bis(2-methoxyethyl)-4,4'-bis(aminomethyl)stilbene with bromoacetyl bromide; the preparation of N,N'-bis(2,2-dichloropropanoyl)-N,N'-diisopropyl-4,4'-bis(aminomethyl)stilbene by reacting N,N'-diisopropyl-4,4'-bis(aminomethyl)stilbene with 2,2-dichloropropanoyl chloride; and, the preparation of N,N'-bis(diiodoacetyl)-N,N'-bis(2-hydroxyethyl)-4,4'-bis(aminomethyl)stilbene by reacting N,N'-bis(2-hydroxyethyl)-4,4'-bis(aminomethyl)stilbene with methyl diiodoacetate or diiodoacetyl chloride.

In the preparation of bis(chloroformamide), i.e., where Ac is chloroformyl, the bis-amine, preferably as its dihydrochloride, is reacted with phosgene while suspended in a nonpolar solvent, e.g., toluene, as illustrated by the preparation of N,N'-bis(chloroformyl)-N,N'-diethyl-4,4'-bis(aminomethyl)stilbene by bubbling phosgene into a stirred refluxing suspension of N,N'-diethyl-4,4'-bis(aminomethyl)stilbene dihydrochloride in toluene.

The intermediate N,N'-di-Z-4,4'-bis(aminomethyl)stilbenes having Formula II above are conveniently prepared by reacting the corresponding 4,4'-bis(N-Z-carbamyl)stilbene with a suitable reducing agent, e.g., lithium aluminum hydride. This reaction was carried out preferably in an anhydrous lower alkanol, e.g., ethanol, at reflux temperature. The 4,4'-bis(N-Z-carbamyl)stilbenes are conveniently prepared by reacting stilbene-4,4'-dicarbonyl chloride with at least two molar equivalent quantities of the appropriate amine of the formula Z—$NH_2$ where Z is defined as in Formula II.

The compounds of my invention of Formula I where Z is —Y—O—Ac' are prepared by reacting one of my compounds of Formula I where Z is —Y—OH, hereinabove described, with an acylating agent selected from the group consisting of those having the formulas Ac''-halogen or (Ac'')$_2$O, or formic acid, where Y has the meaning given above for Formula I and Ac'' is like Ac' but excluding formyl, that is, Ac'' is a carboxylic acyl group having from two to eight carbon atoms as illustrated above for Ac'. When an acyl halogen, Ac''-halogen, is used, the halide halogen, i.e., the halo radical attached to carbonyl is preferably chloro; however, other halo radicals, i.e., bromo, iodo and fluoro, also can be used. Illustrations of my invention are: the preparation of
N,N'-bis(dichloroacetyl)-N,N'-bis(dichloroacetyl)-4,4'-bis(aminomethyl)stilbene by reacting
N,N'-bis(dichloroacetyl)-N,N'-bis(2-hydroxyethyl)-4,4'-bis(aminomethyl)stilbene with acetyl chloride or acetic anhydride; the preparation of
N,N'-bis(bromoacetyl)-N,N'-bis[2-(n-butanoyl)-ethyl]-4,4'-bis-(aminomethyl)stilbene by reacting
N,N'-bis(bromoacetyl)-N,N'-bis(2-hydroxyethyl)-4,4'-bis(aminomethyl)stilbene with n-butanoyl chloride or n-butanoic anhydride; and the preparation of
N,N'-bis(2,2-dichloropropanoyl)-N,N'-bis(3-formyloxypropyl)-4,4'-bis(aminomethyl)stilbene by reacting
N,N'-bis(2,2,-dichloropropanoyl)-N,N'-bis(3-hydroxypropyl)-4,4'-bis(aminomethyl)stilbene with formic acid.
When an acyl halide, Ac''-halogen, is used as the acylating agent, the reaction is carried out preferably below room temperature, with chilling if necessary. When an acyl anhydride, (Ac'')$_2$O, is used, the reaction can be carried out at room temperature or preferably higher, e.g., heating on a steam bath.

The chemical structure of my novel N,N,N',N'-tetrasubstituted-4,4'-bis(aminomethyl)stilbenes of the foregoing Formula I and N,N'-di-Z-4,4'-bis(aminomethyl)stilbenes of Formula II are established by the modes of syntheses and corroborated by the correspondence of calculated and found values for the elementary analyses for representative examples.

The following examples will further illustrate specific embodiments of the invention without, however, limiting it thereto.

*Intermediates*

Intermediate N,N'-di-Z-4,4'-bis(aminomethyl)stilbenes of Formula II above and their preparation are illustrated in the following paragraphs.

The intermediate N,N'-diethyl-4,4'-bis(aminomethyl)stilbene was prepared in two steps as follows: 28 g. of stilbene-4,4'-dicarbonyl chloride was added portionwise to 8.3 g. of 70% aqueous ethylamine in an Erlenmeyer flask, swirling the amine during the addition of the acid chloride. More 70% aqueous ethylamine was added as needed, and the mixture was cooled periodically. The resulting solid was collected and washed with water yielding 28 g. (94.5%) of 4,4'-bis(N-ethylcarbamyl)stilbene, M.P. 344–345° C. This intermediate was used in the following preparation without further purification.

Lithium aluminum hydride powder (8.5 g.) was placed in an 500 cc. 3-necked round bottom flask equipped with an efficient condenser, a stirrer and an addition funnel. Absolute ether (250 cc.) was added dropwise and then more rapidly until all of it had been added. To this mixture was added 9.7 g. of 4,4'-bis(N-ethylcarbamyl)stilbene and the resulting mixture was stirred at room temperature for about 30 minutes, refluxed for 2 hours and then allowed to stand at room temperature over the weekend. The hardened cake under the ether was broken up and stirred vigorously while 40 cc. of absolute ethanol was added dropwise. This was followed by addition of water and then 6 N hydrochloric acid (about 50 cc.). Finally, 40 cc. of water was added and the entire mixture filtered. Since the mixture would not filter, it was added to about 150 cc. of 35% aqueous sodium hydroxide solution and the alkaline mixture heated briefly. The alkaline mixture was then extracted with benzene; and the benzene extract was filtered and concentrated by distilling in vacuo to yield a solid, which was triturated with n-pentane and collected to yield 5.2 g. (59%) of the intermediate N,N'-diethyl-4,4'-bis(aminomethyl)stilbene. A small sample of this product was recrystallized from n-hexane to yield the purified material, M.P. 100–101° C.

*Analysis.*—Calcd. for $C_{20}H_{26}N_2$: N, 9.51. Found: N, 9.57.

Other N,N'-dialkyl-4,4'-bis(aminomethyl)stilbenes that were prepared following the foregoing procedure and using the appropriate reactants are N,N'-diisopropyl-4,4'-bis(aminomethyl)stilbene and N,N'-dimethyl-4,4'-bis(aminomethyl)stilbene.

Other N,N'-di-Z-4,4'-bis(aminomethyl)stilbenes that are prepared following the above procedure and using the appropriate reactants are
N,N'-di-n-propyl-4,4'-bis(aminomethyl)stilbene,
N,N'-diisobutyl-4,4'-bis(aminomethyl)stilbene,
N,N'-di-n-hexyl-4,4'-bis(aminomethyl)stilbene,
N,N'-di-n-octyl-4,4'-bis(aminomethyl)stilbene,
N,N'-di-2-propenyl-4,4'-bis(aminomethyl)stilbene,
N,N'-di-3-butenyl-4,4'-bis(aminomethyl)stilbene,
N,N'-di-2-propynyl-4,4'-bis(aminomethyl)stilbene,
N,N'-di-3-hexynyl-4,4'-bis(aminomethyl)stilbene,
N,N'-dicyclopropyl-4,4'-bis(aminomethyl)stilbene,
N,N'-dicyclohexyl-4,4'-bis(aminomethyl)stilbene,
N,N'-bis(cyclopentylmethyl)-4,4'-bis(aminomethyl)stilbene,
N,N'-bis(2-cyclohexylethyl)-4,4'-bis(aminomethyl)stilbene,
N,N'-diphenyl-4,4'-bis(aminomethyl)stilbene,
N,N'-bis(2-methylphenyl)4,4'-bis(aminomethyl)stilbene,
N,N'-bis(3-ethylphenyl)-4,4'-bis(aminomethyl)stilbene,
N,N'-bis(2,4-dimethylphenyl)-4,4'-bis(aminomethyl)stilbene,
N,N'-dibenzyl-4,4'-bis(aminomethyl)stilbene,
N,N'-bis(2-phenethyl)-4,4'-bis(aminomethyl)stilbene,
N,N'-bis(2-hydroxyethyl)-4,4'-bis(aminomethyl)stilbene,
N,N'-bis(3-hydroxypropyl)-4,4'-bis(aminomethyl)stilbene, N,N'-bis(2-hydroxypropyl)-4,4'-bis(aminomethyl)-
   stilbene,
N,N'-bis(4-hydroxybutyl)4,4'-bis(aminomethyl)stilbene,
N,N'-bis(6-hydroxyhexyl)-4,4'-bis(aminomethyl)stilbene,
N,N'-bis(2-ethoxyethyl)-4,4'-bis(aminomethyl)stilbene,
N,N'-bis(3-methoxypropyl)-4,4'-bis(aminomethyl)-
   stilbene,
N,N'-bis(2-n-hexoxyethyl)-4,4'-bis(aminomethyl)-
   stilbene,
N,N'-bis(6-methoxyhexyl)-4,4'-bis(aminomethyl)-
   stilbene,
N,N'-bis(2-phenoxyethyl)-4,4'-bis(aminomethyl)stilbene,
N,N'-bis(2-benzyloxyethyl)-4,4'-bis(aminomethyl)-
   stilbene, and
N,N'-bis(3-cyclohexyloxypropyl)-4,4'-bis(aminomethyl)-
   stilbene.

Final Products

N,N' - bis(dichloroacetyl)-N,N'-diethyl-4,4'-bis(aminomethyl)stilbene was prepared as follows: A solution containing 4.2 g. of dichloroacetyl chloride in 30 cc. of ethylene dichloride was added dropwise to a cold mixture containing 4 g. of N,N'-diethyl-4,4'-bis(aminomethyl) stilbene in 70 cc. of ethylene dichloride, 1.1 g. of sodium hydroxide and 25 cc. of water, maintaining the temperature of the reaction mixture at 0–5° C. during addition. The reaction mixture was stirred for about 30 minutes after addition had been completed, while allowing it to warm up to room temperature. The organic layer of the basic reaction mixture was separated, and washed successively with dilute (5%) aqueous hydrochloric acid, water, dilute aqueous sodium acetate solution and water. It was then evaporated by distilling in vacuo to yield a viscous oil which was dried by warming at 0.2 mm. The oil was then taken up in hot isopropyl alcohol and the resulting solution chilled. The precipitate that separated was collected and recrystallized from isopropyl alcohol to yield 5.8 g. of white product, N,N'-bis(dichloroacetyl)-N,N'-diethyl-4,4'-bis(aminomethyl)stilbene, M.P. 134.6–136.4° C. (corr.).

*Analysis.*—Calcd. for $C_{24}H_{26}Cl_4N_2O_2$: Cl, 27.47; N, 5.43. Found: Cl, 27.21; N, 5.38.

Other N,N' - bis(halogenated-alkanoyl)-N,N'-dialkyl-4,4'-bis(aminomethyl)stilbenes that were prepared following the foregoing described procedure using the appropriate reactants are: N,N'-bis(chloroacetyl)-N,N'-diethyl-4,4'-bis(aminomethyl)stilbene, M.P. 120.4–122.6° C. (corr.); N,N'-bis(trichloroacetyl)-N,N'-diethyl-4,4'-bis(aminomethyl)stilbene, M.P. 140.2–142.6° C. (corr.); 4,4'-bis(dichloroacetyl)-N,N'-diisopropyl-4,4'-bis(aminomethyl)stilbene, M.P. 184.2–188.6° C.; and, N,N'-bis(dichloroacetyl) - N,N'-dimethyl-4,4'-bis(aminomethyl)stilbene, M.P. 180.4–187.6° C. (corr.).

Other N,N'-bis(halogenated-alkanoyl)-N,N'-di-Z-4,4'-bis(aminomethyl)stilbenes that are prepared following the above procedure and using the appropriate halogenated-alkanoylating agent (halogenated-alkanoyl halide, preferably chloride, except where noted otherwise) and N,N'-di-Z-4,4'-bis(aminomethyl)stilbene are:

N,N'-bis(bromoacetyl)-N,N'-di-n-propyl-4,4'-bis(aminomethyl)stilbene,
N,N'-bis(iodoacetyl)-N,N'-diisobutyl-4,4'-bis(aminomethyl)stilbene,
N,N'-bis(fluoroacetyl)-N,N'-di-n-hexyl-4,4'bis(aminomethyl)stilbene,
N,N'-bis(dibromoacetyl)-N,N'-di-n-octyl-4,4'-bis(aminomethyl)stilbene,
N,N'-bis(diiodoacetyl)-N,N'-di-2-propenyl-4,4'-bis(aminomethyl)stilbene,
N,N'-bis(difluoroacetyl)-N,N'-di-3-butenyl-4,4'-bis(aminomethyl)stilbene,
N,N'-bis(bromochloroacetyl)-N,N'-di-3-propynyl-4,4'-bis(aminomethyl)stilbene,
N,N'-bis(dichlorofluoroacetyl)-N,N'-di-3-hexynyl-4,4'-bis(aminomethyl)stilbene,
N,N'-bis(tribromoacetyl)-N,N'-dicyclopropyl-4,4'-bis(aminomethyl)stilbene,
N,N'-bis(bromodichloroacetyl)-N,N'-dicyclohexyl-4,4'-bis(aminomethyl)stilbene,
N,N'-bis(2-chloropropanoyl)-N,N'-bis(cyclopentylmethyl)-4,4'-bis(aminomethyl)stilbene,
N,N'-bis(3-chloropropanoyl)-N,N'-bis(2-cyclohexylethyl)-4,4'-bis(aminomethyl)stilbene,
N,N'-bis(2-bromopropanoyl)-N,N'-diphenyl-4,4'-bis(aminomethyl)stilbene,
N,N'-bis(2,2-dichloropropanoyl)-N,N'-bis(2-methylphenyl)-4,4'-bis(aminomethyl)stilbene,
N,N'-bis(2,3-dichloropropanoyl)-N,N'-bis(3-ethylphenyl)-4,4'-bis(aminomethyl)stilbene,
N,N'-bis(2,2,3-trichloropropanoyl)-N,N'-bis(2,4-dimethylphenyl)-4,4'-bis(aminomethyl)stilbene,
N,N'-bis(2-chlorobutanoyl)-N,N'-dibenzyl-4,4'-bis(aminomethyl)stilbene,
N,N'-bis(3-chlorobutanoyl)-N,N'-bis(2-phenethyl)-4,4'-bis(aminomethyl)stilbene,
N,N'-bis(dichloroacetyl)-N,N'-bis(2-hydroxyethyl)-4,4'-bis(aminomethyl)stilbene (using methyl dichloroacetate),
N,N'-bis(4-chlorobutanoyl)-N,N'-bis(3-hydroxypropyl)-4,4'-bis(aminomethyl)stilbene,
N,N'-bis(2,2-dichlorobutanoyl)-N,N'-bis(2-hydroxypropyl)-4,4'-bis(aminomethyl)stilbene (using ethyl 2,2-dichlorobutanoate),
N,N'-bis(2,3-dibromobutanoyl)-N,N'-bis(4-hydroxybutyl)-4,4'-bis(aminomethyl)stilbene,
N,N'-bis(2,2-dibromobutanoyl)-N,N'-bis(6-hydroxyhexyl)-4,4'-bis(aminomethyl)stilbene,
N,N'-bis(dibromoacetyl)-N,N'-bis(2-ethoxyethyl)-4,4'-bis(aminomethyl)stilbene (using dibromoacetyl bromide),
N,N'-bis(2,3,4-trichlorobutanoyl)-N,N'-bis(3-methoxypropyl)-4,4'-bis(aminomethyl)stilbene,
N,N'-bis(2,2,3-tribromobutanoyl)-N,N'-bis(2-n-hexoxyethyl)-4,4'-bis(aminomethyl)stilbene,
N,N'-bis(chloroacetyl)-N,N'-bis(6-methoxyhexyl)-4,4'-bis(aminomethyl)stilbene,
N,N'-bis(dichloroacetyl)-N,N'-bis(2-phenoxyethyl)-4,4'-bis(aminomethyl)stilbene,
N,N'-bis(dichloroacetyl)-N,N'-bis(2-benzyloxyethyl)-4,4'-bis(aminomethyl)stilbene, and
N,N'-bis(dibromoacetyl)-N,N'-bis(3-cyclohexyloxypropyl)-4,4'-bis(aminomethyl)stilbene.

N,N' - bis(dichloroacetyl) - N,N'-bis(2-acetoxyethyl)-4,4'-bis(aminomethyl)stilbene is obtained by mixing N,N' - bis(dichloroacetyl)-N,N'-bis(2-hydroxyethyl)-4,4'-bis(aminomethyl)stilbene with at least two molar equivalent quantities of acetic anhydride in the presence of an acid-acceptor, e.g., pyridine, and allowing the reaction mixture to stand at room temperature for about twelve hours. The product is isolated by adding water to the reaction mixture and collecting the solid that separates. The same product is obtained using acetyl chloride instead of acetic anhydride and an original mixing temperature of about 0°–10° C.

Using other acyl anhydrides or halides or formic acid and the corresponding N,N' - [halogenated - (lower - alkanoyl)] - N,N' - bis(hydroxyalkyl) - 4,4' - bis(aminomethyl)stilbene and following the above procedure, the resulting products are obtained: N,N'-bis(dichloroacetyl) - N,N'-bis(2-n-butanoyloxyethyl)-4,4'-bis(aminomethyl)stilbene using n-butanoyl chloride, N,N'-bis(4-chlorobutanoyl) - N,N'-bis(3-chloroacetoxypropyl)-4,4'-bis(aminomethyl)stilbene using chloroacetic anhydride or chloroacetyl chloride, N,N'-bis(2,2-dichlorobutanoyl)-N,N' - bis(2 - dichloroacetoxypropyl) - 4,4' - bis(aminomethyl)stilbene using dichloroacetyl chloride, N,N'-bis (2,3 - dibromobutanoyl) - N,N' - bis(4 - trichloroacetoxybutyl) - 4,4' - bis(aminomethyl)stilbene using trichloroacetyl chloride, N,N'-bis(2,2-dibromobutanoyl)-N,N'-bis(6 - acetoxyhexyl) - 4,4'-bis(aminomethyl)stilbene using acetic anhydride or acetyl chloride, N,N'-bis(dichloroacetyl) - N,N'-bis[2-(3-carboxypropanoyloxy)ethyl]-4,4'-bis(aminomethyl)stilbene using succinic anhydride, N,N'-bis(dichloroacetyl) - N,N' - bis(2 - diethylaminoacetoxyethyl)-4,4'-bis(aminomethyl)stilbene using diethylaminoacetyl chloride, N,N' - bis(dichloroacetyl) - N,N'-bis(2-benzoyloxyethyl) - 4,4' - bis(aminomethyl)stilbene using benzoyl chloride, N,N'-bis(dichloroacetyl)-N,N'-bis[2-(4 - chlorobenzoyloxy)ethyl] - 4,4' - bis(aminomethyl)stilbene using 4-chlorobenzoyl chloride, and N,N'-bis(dichloroacetyl) - N,N' - bis(2 - formyloxyethyl) - 4,4' - bis(aminomethyl)stilbene using formic acid.

N,N' - bis(chloroformyl)-N,N'-diethyl-4,4'-bis(aminomethyl)stilbene is obtained by bubbling phosgene into a stirred refluxing suspension of N,N' - diethyl - 4,4' - bis (aminomethyl)stilbene dihydrochloride in toluene.

The N,N,N',N'-tetrasubstituted-4,4'-bis(aminomethyl)-stilbenes of the foregoing examples when administered orally in aqueous suspension to hamsters infected with *Endamoeba criceti* were found to completely clear the animals of the infection at drug levels below 200 mg. per kg. of body weight. Some of the compounds, for instance, N,N' - bis(dichloroacetyl) - N,N' - diethyl-4,4'-bis(aminomethyl)stilbene and N,N'-bis(chloroacetyl)-N,N'-diethyl-4,4'-bis(aminomethyl)stilbene, have $AED_{50}$ values in the range between 10 and 50 mg. per kg. of body weight, $AED_{50}$ meaning the approximate effective dose necessary to clear 50% of the hamsters of the amebic infection. The compounds of my invention also can be administered in solid form, e.g., as tablets or in capsules, and optionally admixed with conventional excipients such as starch talc, and the like.

I claim:
1. A compound having the formula

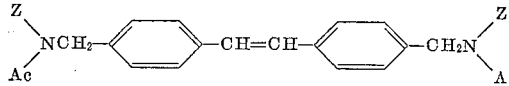

where Ac is halo-(lower-alkanoyl) and Z is a member selected from the group consisting of hydrocarbon of the formula R, hydroxyalkyl of the formula —Y—OH, hydrocarbonoxyalkyl of the formula —Y—O—R and acyloxyalkyl of the formula —Y—O—Ac', where R is hydrocarbon having from one to eight carbon atoms, Y is polycarbon-lower-alkylene having from two to six carbon atoms and having its two free valence bonds on different carbon atoms, and Ac' is carboxylic-acyl having from one to eight carbon atoms.

2. A compound having the formula

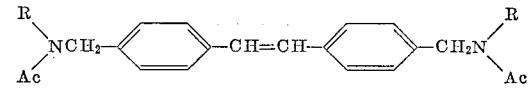

where Ac is halo-(lower-alkanoyl) and R is hydrocarbon having from one to eight carbon atoms.

3. N,N' - bis(dichloroacetyl) - N,N' - diethyl - 4,4'-bis(aminomethyl)stilbene.
(aminomethyl)stilbene.

4. N,N' - bis(chloroacetyl) - N,N' - diethyl - 4,4' - bis

5. N,N' - bis(trichloroacetyl) - N,N' - diethyl - 4,4'-bis(aminomethyl)stilbene.

6. 4,4' - bis(dichloroacetyl) - N,N'-diisopropyl-4,4'-bis(aminomethyl)stilbene.

7. N,N' - bis(dichloroacetyl) - N,N' - dimethyl-4,4'-bis(aminomethyl)stilbene.

References Cited in the file of this patent
UNITED STATES PATENTS

| | | |
|---|---|---|
| 2,009,396 | Goldstein | July 30, 1935 |
| 2,732,402 | Surrey | Jan. 24, 1956 |
| 2,732,403 | Surrey | Jan. 24, 1956 |
| 2,862,967 | Surrey | Dec. 2, 1958 |
| 2,929,844 | Surrey | Mar. 22, 1960 |

OTHER REFERENCES

Freund et al.: "Deutsche Chemische Gesellschaft Berichte," vol. 42, pages 1746–66 (1909).

Albert et al.: "Jour. Chem. Soc." (1947), pages 1452–5.

UNITED STATES PATENT OFFICE
CERTIFICATE OF CORRECTION

Patent No. 3,141,042   July 14, 1964

Alexander R. Surrey

It is hereby certified that error appears in the above numbered patent requiring correction and that the said Letters Patent should read as corrected below.

Column 1, line 58, for "alkyated-phenyl" read -- alkylated-phenyl --; lines 63 and 64, for "cyclopental" read -- cyclopentyl --; column 2, lines 31 to 35, after the formula, insert -- (II) --; column 3, line 47, for "N,N'-bis(dichloroacetyl)-N,N'-bis(dichloroacetyl)-" read -- N,N'-bis(dichloroacetyl)-N,N'-bis(2-acetoxyethyl)- --; line 59, for "2,2,-" read -- 2,2- --; column 4, line 67, and column 5, line 3, for "4,4'-", each occurrence, read -- -4,4'- --; same column 5, line 64, for "-4,4'" read -- -4,4'- --; column 8, line 19, strike out "(aminomethyl)-stilbene." and insert the same after "bis", second occurrence, in line 20, same column 8.

Signed and sealed this 5th day of January 1965.

(SEAL)
Attest:

ERNEST W. SWIDER
Attesting Officer

EDWARD J. BRENNER
Commissioner of Patents